US012126442B2

(12) United States Patent
Zhou et al.

(10) Patent No.: US 12,126,442 B2
(45) Date of Patent: Oct. 22, 2024

(54) RELAY ASSISTED RETRANSMISSION

(71) Applicant: QUALCOMM Incorporated, San Diego, CA (US)

(72) Inventors: Yan Zhou, San Diego, CA (US); Tao Luo, San Diego, CA (US); Sony Akkarakaran, Poway, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/017,558

(22) Filed: Sep. 10, 2020

(65) Prior Publication Data

US 2021/0083804 A1 Mar. 18, 2021

Related U.S. Application Data

(60) Provisional application No. 62/900,382, filed on Sep. 13, 2019.

(51) Int. Cl.
*H04L 1/08* (2006.01)
*H04L 1/1607* (2023.01)
*H04W 88/04* (2009.01)

(52) U.S. Cl.
CPC .............. *H04L 1/08* (2013.01); *H04L 1/1607* (2013.01); *H04W 88/04* (2013.01)

(58) Field of Classification Search
CPC ....... H04L 1/08; H04L 1/1607; H04L 1/1887; H04L 1/1896; H04L 2001/0097; H04W 88/04

See application file for complete search history.

(56) References Cited

U.S. PATENT DOCUMENTS

| 2014/0169261 A1* | 6/2014 | Ming ................... H04W 88/04 370/315 |
| 2021/0021536 A1* | 1/2021 | Ganesan ............... H04L 1/1893 |
| 2021/0037603 A1* | 2/2021 | Li .......................... H04L 1/189 |
| 2021/0045093 A1* | 2/2021 | Rao ....................... H04W 72/04 |

OTHER PUBLICATIONS

CATT: "HARQ Procedure for Mode 1", R2-1900218, Revision of R2-1816897, 3GPP TSG-RAN WG2 Meeting #105, 3rd Generation Partnership Project, Mobile Competence Centre, 650, Route Des Lucioles, F-06921, Sophia-Antipolis Cedex, France, vol. RAN WG2, No. Athens, Greece, Feb. 25, 2019-Mar. 1, 2019, Feb. 15, 2019, XP051601617, 5 Pages.

(Continued)

*Primary Examiner* — Saad A. Waqas
(74) *Attorney, Agent, or Firm* — Harrity & Harrity, LLP

(57) ABSTRACT

Methods, systems, and devices for wireless communications are described. In some systems one or more first user equipment (UE) may be configured to relay transmissions to second user equipment upon reception of a negative acknowledgment (NACK) from the second user equipment. In other systems, one or more UEs may be configured to receive transmissions relayed from other UEs in response to a NACK.

20 Claims, 9 Drawing Sheets

(56) References Cited

OTHER PUBLICATIONS

Convida Wireless: "Consideration on Enhancements of NR Uu to Control NR Sidelink", R1-1813623_Consideration_NR-Uu_Control_NR-Sidelink, 3GPP TSG-RAN WG1, Meeting #95, 3rd Generation Partnership Project, Mobile Competence Centre, 650, Route Des Lucioles, F-06921, Sophia-Antipolis Cedex, France, vol. Ran WG1, No. Spokane, USA, Nov. 12, 2018-Nov. 16, 2018, Nov. 11, 2018, XP051555681, 3 Pages.
International Search Report and Written Opinion—PCT/US2020/050576—ISA/EPO—Dec. 10, 2020.
SAMSUNG: "Considerations on Sidelink HARQ Procedure", 3GPP TSG RAN WG1 #96, R1-1902278, 3GPP TSG RAN WG1, Meeting #96, 3rd Generation Partnership Project, Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 15, 2019, XP051599973, 11 Pages.

* cited by examiner

RELAY ASSISTED RETRANSMISSION

CROSS-REFERENCE TO RELATED APPLICATION

This patent application claims priority to U.S. Provisional Patent Application No. 62/900,382, filed on Sep. 13, 2019, entitled "RELAY ASSISTED RETRANSMISSION," and assigned to the assignee hereof. The disclosure of the prior application is considered part of and is incorporated by reference into this patent application.

INTRODUCTION

The following relates generally to wireless communications, and more specifically to relaying of messages in systems requiring high reliability and/or low response times, such as industrial internet of things (IIoT), vehicle-to-everything (V2X), or device-to-device (D2D) communications, and the like.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications at a first UE is described. The method may include receiving a data packet sent to a second UE; identifying a failure of the second UE to receive the data packet; and transmitting the received data packet to the second UE.

An apparatus for wireless communications at a first UE is described. The apparatus may include a processor, memory in electronic communication with the processor, and instructions stored in the memory. The instructions may be executable by the processor to cause the apparatus to receive a data packet sent to a second UE; identify a failure of the second UE to receive the data packet; and transmit the received data packet to the second UE.

Another apparatus for wireless communications at a first UE is described. The apparatus may include means for receiving a data packet sent to a second UE; means for identifying a failure of the second UE to receive the data packet; and means for transmitting the received data packet to the second UE.

A non-transitory computer-readable medium storing code for wireless communications at a first UE is described. The code may include instructions executable by a processor to cause the first UE to receive a data packet sent to a second UE; identify a failure of the second UE to receive the data packet; and transmit the received data packet to the second UE.

In some examples of the method, apparatuses, and non-transitory computer-readable medium described herein, the first and second UE may receive configuration information; may receive and transmit the data packet based on the configuration information. In some examples, the first UE may detecting a negative acknowledgment (NAK) transmitted by the second UE; may detect a successful reception of the data packet by the second UE by receiving an ACK message; and may retransmit the ACK or NACK message to the source transmitter of the data packet.

A method of wireless communications at a first UE is described. The method may include receiving control information from a first device, the control information including an identification of resources for receiving a data transmission; identifying a failure to receive the data transmission from the first device on the identified resources; transmitting a negative acknowledgement; and receiving a retransmission of the data transmission from a second device.

An apparatus for wireless communications at a first UE is described. The apparatus may include a processor, memory in electronic communication with the processor, and instructions stored in the memory. The instructions may be executable by the processor to cause the apparatus to receive control information from a first device, the control information including an identification of resources for receiving a data transmission; identify a failure to receive the data transmission from the first device on the identified resources; transmit a negative acknowledgement; and receive a retransmission of the data transmission from a second device.

Another apparatus for wireless communications at a first UE is described. The apparatus may include means for receiving control information from a first device, the control information including an identification of resources for receiving a data transmission; means for identifying a failure to receive the data transmission from the first device on the identified resources; means for transmitting a negative acknowledgement; and means for receiving a retransmission of the data transmission from a second device.

A non-transitory computer-readable medium storing code for wireless communications at a first UE is described. The code may include instructions executable by a processor to cause the first UE to to receive control information from a first device, the control information including an identification of resources for receiving a data transmission; identify a failure to receive the data transmission from the first device on the identified resources; transmit a negative acknowledgement; and receive a retransmission of the data transmission from a second device.

Some examples of the method, apparatuses, and non-transitory computer-readable medium described herein may further include operations, features, means, or instructions for receiving configuration information, which may include a reservation of resources for receiving the retransmission.

A method of wireless communications at a base station is described. The method may include configuring first and second user equipment (UEs) for NACK triggered relay; transmitting a data packet to the first UE; identifying a failure of the first UE to receive the data packet; and retransmitting the data packet to the first UE.

An apparatus for wireless communications at a base station is described. The apparatus may include a processor, memory in electronic communication with the processor, and instructions stored in the memory. The instructions may be executable by the processor to cause the apparatus to configure first and second user equipment (UEs) for NACK triggered relay; transmit a data packet to the first UE; identify a failure of the first UE to receive the data packet; and retransmit the data packet to the first UE.

Another apparatus for wireless communications at a base station is described. The apparatus may include means for configuring first and second user equipment (UEs) for NACK triggered relay; means for transmitting a data packet to the first UE; means for identifying a failure of the first UE to receive the data packet; and means for retransmitting the data packet to the first UE.

A non-transitory computer-readable medium storing code for wireless communications at a base station is described. The code may include instructions executable by a processor to cause the bae station to to configure first and second user equipment (UEs) for NACK triggered relay; transmit a data packet to the first UE; identify a failure of the first UE to receive the data packet; and retransmit the data packet to the first UE.

In some examples of the method, apparatuses, and non-transitory computer-readable medium described herein, may further include sending a configuration information to the first and second UEs; retransmitting the data transmission based on the configuration information; and/or receiving an ACK or NACK from the first UE that has been relayed by the second UE. In other examples, the configuration information may include information of pre-reserved resources for restransmitting the data transmission.

DETAILED DESCRIPTION

Figure 1:
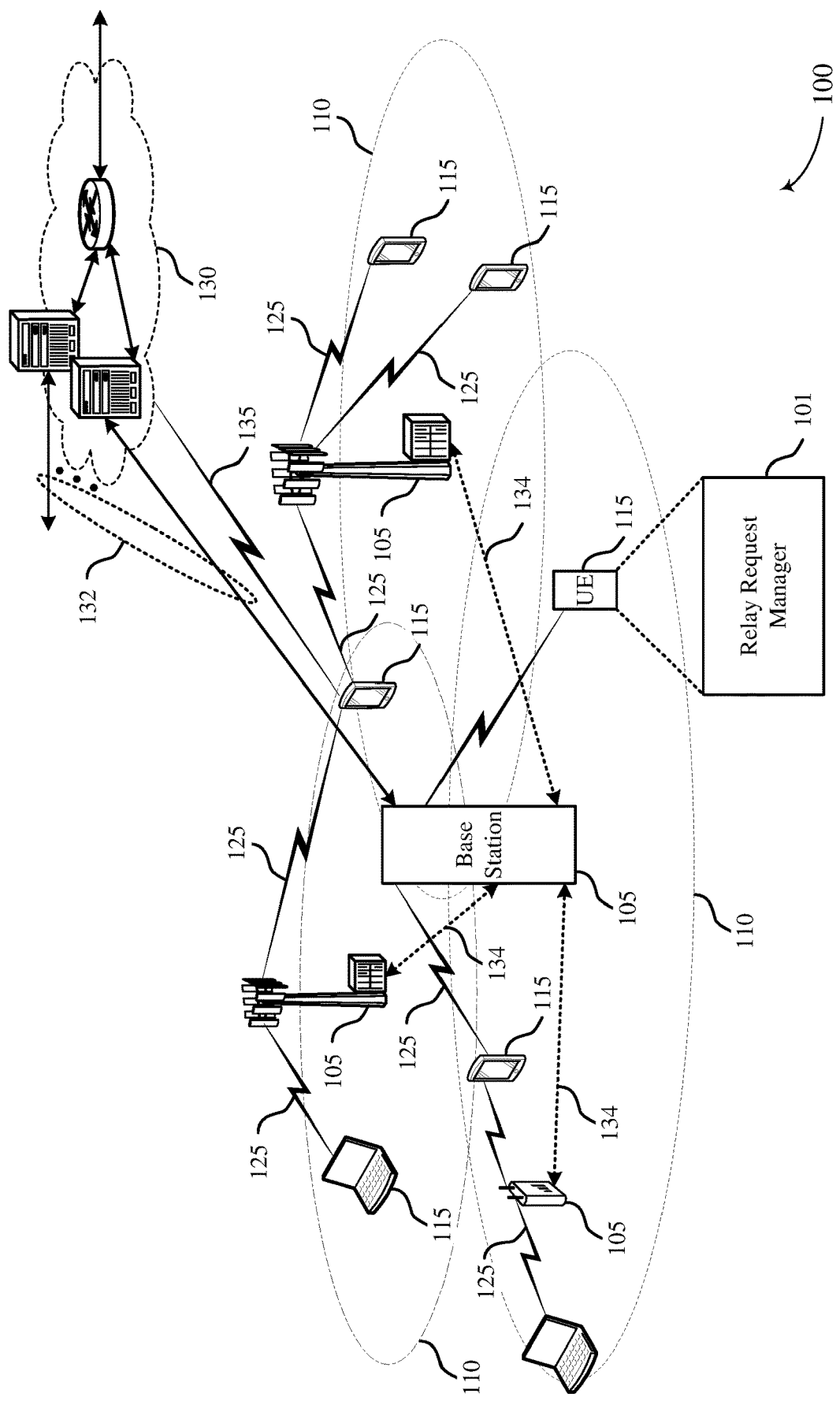
FIGS. 1, 2A and 2B illustrate examples of wireless communications systems that support relaying of messages, in accordance with one or more aspects of the present disclosure.

Some wireless communications systems (e.g., IIoT, V2X, etc.), may required ultra reliable, low latency communications (URLLC) between UEs and the network. In some examples, these UEs may be examples of vehicles in a V2X system. In other examples, the UEs may be industrial machines, such as manufacturing robots. Failure to receive a message may result in adverse events such as damage to a vehicle or robot. However, in some cases, certain effects—such as shadowing and blocking—may reduce the reliability of communications between the network and a UE. In cases of shadowing and blocking, the received signal power at a UE fluctuates due to an obstruction of the propagation path between the transmitter of the signal and the receiver. For example, a truck may move between a vehicle and a base station, or a material handling robot may move between a wireless automated machine and its controller.

Both shadowing and blocking may be measured in decibels (dB). If shadowing is occurring, the path loss may be approximately 7 dB, while blocking may result in a path loss of approximately 10-15 dB. Shadowing may result from the receiving UE being in the radio shadow of an object that covers a large area (e.g., an object, such as a large building, may shadow a UE). Blocking may result from an object located in the direct path between the transmitting UE and the receiving UE (e.g., an object, such as a truck or other vehicle, may block a UE). In some cases, multi-blockers (e.g., more than one blocker or obstruction) may exist between the transmitter and receiver and may cause around 30 dB of path loss. Both shadowing and blocking may result in strong signal attenuation.

Blocking, shadowing, or a combination thereof may cause enough signal attenuation such that a receiver may be unable to receive a packet from a source transmitter. In some cases, the source transmitter may retransmit the packet; however, this retransmission may continue to be impacted by blocking or shadowing. The number of repetitions and increased transmit power needed for the receiver to successfully receive the packet (i.e., to overcome the blocking, shadowing, or both) may cause over-provisioning of resources, interference with other UEs or transmitters, and may result in significant latency in the system. In some cases, multiple retransmissions of the packet with increased transmit power may cause signal collisions and interference at other UEs. Interference and latency due to blocking and shadowing may cause performance degradation in the wireless communications system.

If a receiving UE identifies that it failed to receive a transmitted packet (e.g., due to blocking, shadowing, etc.), the receiving UE may transmit a signal requesting retransmission of the missed packet (e.g., using a negative acknowledgment (NACK) message). The request may indicate that the receiving UE failed to receive the packet and that further retransmissions of the packet should be sent. In some cases, the source transmitter may not receive the request due to shadowing, blocking, or a combination thereof. In other cases, the source transmitter may receive the request, but any performance gain achieved by retransmitting the original packet may be limited if the retransmission to the receiving UE continues to be shadowed, blocked, or both. Furthermore, if the number of resources, the transmit power, or both for the retransmission are significantly increased in order to reach the receiving UE, the retransmission may cause collisions with other signals and interference with other UEs throughout the network, degrading performance in the network.

To increase reliability of the receiving UE to successfully receive the packet one or more other UEs may be configured to receive and possibly relay transmissions to the receiving UE. In some cases, at least one of these UEs may have successfully received the packet during the original transmission from the source transmitter. Any UE that successfully received the packet and receives the request for retransmission (e.g., the NACK) may determine to relay the packet to a target UE that failed to receive the packet. In some cases, the relaying UE may condition relaying the packet based on other factors, such as a link quality with the receiving UE or a distance to the receiving UE. The relay UE may relay the packet to the receiving UE based on the request for retransmission. In some cases, the signal path from the relay UE to the receiving UE may not be blocked or shadowed (e.g., even if the signal path from the source transmitter to the receiving UE is blocked, shadowed, or both). As such, relaying the packet may increase the probability of successful packet reception at the receiving UE.

Aspects of the disclosure are initially described in the context of wireless communications systems. Specific examples are then described for relaying of messages in an IIoT or V2X communications system, but the aspects described herein are applicable to other systems to improve reliability and or latency. Aspects of the disclosure are further illustrated by and described with reference to apparatus diagrams, system diagrams, and flowcharts that relate to relaying of messages.

FIG. 1 illustrates an example of a wireless communications system 100 that supports relaying of messages, in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), Industrial Internet-of-Things (IIoT), Vehicle-t0 anything (V2X), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or D2D protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a source transmitter such as base station 105 (e.g., a vehicle) may transmit a data packet to a UE 115. However, an object may obstruct such signals from reaching the intended or target UE. The blocked UE 115 may determine that it failed to receive a packet from the source transmitter and may transmit a request for retransmission. For example, the target UE may fail to receive an expected transmission that was scheduled via semi-persistent scheduling (SPS) or via a successfully received downlink control information (DCI). The target UE may then transmit a NACK to indicate the failure. Neighboring UEs 115 may detect the NACK transmission and retransmit the lost packet if configured to do so. The neighboring UEs 115 may receive the request, determine if they have received the lost packet, and determine whether to relay the packet. For example, a UE 115 may determine to act as a relay UE if it is close enough to the blocked target UE 115 based on location information of the two UEs 115, if it has a strong enough link quality with the blocked UE 115 based on the reference signal received power (RSRP) of the request, or some combination thereof. The UE 115 that has previously received the data packet from the source transmitter and determines itself to be a valid relay for the blocked UE 115 may transmit (i.e., relay) the packet to the blocked UE 115 based on the request (the NACK). Depending on the positioning of the UEs 115 and the obstruction(s) in the system, while transmissions may be blocked from the original source transmitter to the blocked UE 115, transmissions may be successful from the relay UE 115 to the blocked UE 115.

Figure 2A:
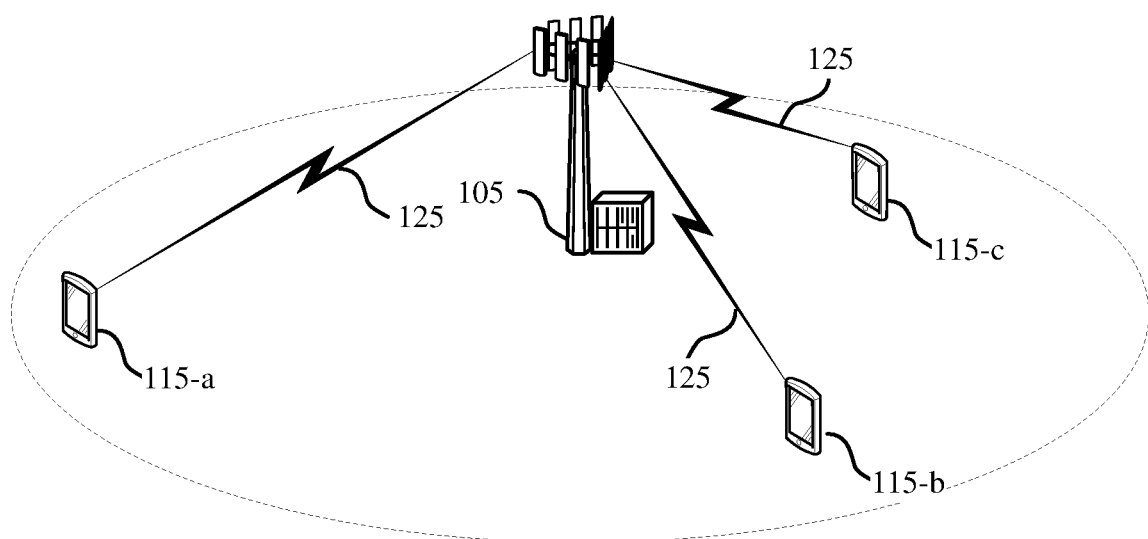

FIG. 2A illustrates an example of a wireless communications system 200 that supports relaying of messages, in accordance with one or more aspects of the present disclosure. In some examples, wireless communications system 200 may implement aspects of wireless communications system 100. The wireless communications system 200 may include UEs 115-a, 115-b, and 115-c, which may be examples of UEs 115 as described with reference to FIG. 1. In some cases, UEs 115 may be examples of machines in an IIoT system. In other cases, UEs 115 may be examples of wireless devices in a V2X system. In other cases, UEs 115 may be examples of wireless devices in a URLLC system. In some examples, UE 115-a may implement a procedure for requesting a blocked data packet. For example, UE 115-a may transmit a NACK to base station 105. A UE 115-b may detect the NACK and relay a packet to UE 115-a based on the request. Additionally or alternatively, other wireless devices, such as UEs 115-c, or some combination of these UEs 115 may implement relaying of a requested data packet due to blocking.

Figure 2B:
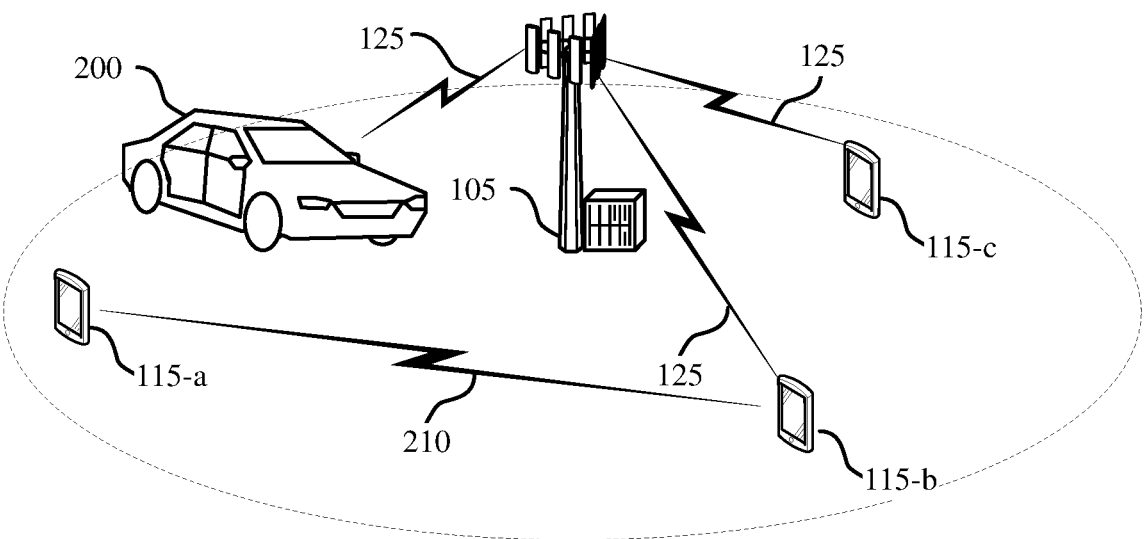

In wireless communications, data packets may be transmitted to a target UE, but packet reception at the target may fail due to shadowing, blocking, interference, or a combination thereof. The packet may, however, be received at other UEs that were not blocked, shadowed, or experiencing significant interference. For example, in FIG. 2B, base station 105 may transmit a packet to UE 115-a. However, in some cases, the transmission may be blocked by some obstruction, such as a object 200, which may be a vehicle or other device, structure, etc. In these cases, the transmitted packet may be unable to reach the intended receiver at UE 115-a with a sufficient signal strength for UE 115-a to successfully receive and decode the packet. In some cases, UE 115-b or UE 115-c may successfully receive the packet base station 105 (e.g., due to the positioning of the obstruction(s) in the system).

Packet reception failure in the system may be due to interference or due to blocking/shadowing. In some cases, the base station 105, the receiving UE 115-a, or both may identify when packet reception failure occurs. The transmitting base station 105 may transmit a control message including control information that indicates resources for transmission of the data packet. The control information may schedule a single transmission, periodic transmissions, semi-persistent transmissions, and/or triggered transmissions. If the receiving UE 115-a is able to decode a control message or channel and determine a transmissions should occur on indicated resources, but is unable to receive and decode a data packet in the indicated resources, the receiving UE 115-a may determine that it missed a transmitted packet.

In some examples, the base station, the receiving UE 115-a, or both may determine a cause of the packet reception failure. For example, if the UE 115-a decodes control information but not data, the UE 115-a may determine if the decoding failure for the data packet is due to interference. In some cases, a path between the transmitter (e.g., base station 105) and the UE 115-a may be unobstructed but the data may be interference limited. This may be determined if the UE 115-a is able to decode multiple (e.g., two) control messages corresponding to multiple (e.g., two) overlapping data transmissions by different transmitters that are too close to one another (and interfere with each other). In another case, if data packet decoding fails and an RSRP or reference signal received quality (RSRQ) measurement of link quality is higher than a certain threshold, then the UE 115-a may determine that the packet decode failure is due to interference. In these cases, the transmitter may retransmit the data packet later when there may be reduced interference. In other cases, packet decode failure may be due to blocking, shadowing, or a combination thereof. For example, UE 115-a may determine that packet decoding failure is due to blocking/shadowing if the UE 115-a does not determine the failure is due to interference. In some cases, UE 115-a may analyze the expected cause of decoding failure. In other cases, UE 115-a may not perform this analysis.

If the receiving UE 115-a measures a weak RSRP, RSRQ, or a combination thereof, the receiving UE 115-a may determine that the packet reception failed due to a weak link between the UE 115-*a* and the transmitter (e.g., base station 105). In some cases, the weak link may be caused by blocking or shadowing. If the remaining delay budget for the packet is low (e.g., below a delay budget threshold), the receiving UE 115-*a* may transmit a NAK message to the transmitting base station 105 that may include a request for retransmission of the data packet. The delay budget specifies an allowed amount of time for the data packet to be delayed between scheduled transmission and reception. In some cases, the receiving UE 115-*a* may determine that the transmitter has scheduled one or more retransmissions of the packet (e.g., based on a bit or field in the decoded downlink control information reserving the resources for a next transmission), and the receiving UE 115-*a* may monitor for the packet in the resources scheduled for retransmission.

If the base station 105 has no further scheduled retransmissions of the packet, it may indicate its last transmission of the packet (e.g., using the bit or field in the control information). In some cases, this transmission may still be blocked from successfully reaching UE 115-*a*. If UE 115-*a* fails to receive the packet, the blocked UE 115-*a* may transmit a signal to request the packet. In some cases, UE 115-*a* may transmit the request if no more retransmissions of the packet are scheduled, if the remaining delay budget for the packet allows (e.g., is above a certain threshold), or if some combination of these conditions are met. Blocked UE 115-*a* may transmit the request and UE 115-*b* may receive the request via side-link 225. In some cases, the request may be blocked from reaching base station 105 (e.g., due to obstructing object 200). In other cases, base station 105 may also receive the request if there is no longer an obstruction between it and UE 115-*a*. The request may contain a source identifier (ID) of the base station 105, a packet ID of the requested data packet, an RSRP threshold for determining if a link quality is strong enough for relaying the packet, a reserved resource on which to send the relayed packet, any required exclusion range for the reserved resource, a modulation and coding scheme (MCS), a transmission mode, a redundancy version (RV) for the relay transmission of the data packet, a reference signal pattern, or some combination of these parameters. The parameters in the request may indicate how a relay UE 115 may relay the packet, such that multiple relay UEs 115 may have similar transmissions (e.g., using the same or similar transmit parameters). The request may additionally reserve the resources indicated in the request, such that other UEs 115 receiving the request but not acting as relays may refrain from transmitting on these resources to avoid interference with the relayed packet.

A UE 115 that receives the packet from the base station 105, such as UE 115-*b*, may receive the request from the blocked UE 115-*a*. In some cases, the UE 115-*b* may determine whether to act as a relay for blocked UE 115-*a* based on one or more parameters. For example, UE 115-*b* may relay the packet if UE 115-*b* is close enough to the blocked UE 115-*a* based on location information for the two UEs 115, if UE 115-*b* has a strong enough link quality with UE 115-*a* (e.g., determined by comparing a current RSRP of the request from UE 115-*a* to an RSRP threshold that may be configured or dynamically indicated in the request), or if a combination of these conditions are met. If the UE 115-*b* determines to act as a relay UE 115-*a* (e.g., UE 115-*b* determines it is near enough to the blocked UE 115-*a*, is not blocked from the UE 115-*a* based on a strong enough link quality with UE 115-*a*, has the indicated resources available for transmission, etc.), then the relay UE 115-*b* may transmit the packet (e.g., via side-link 210) on the prearranged resources. In this way, the wireless communications system 200 may implement relaying of data packets to mitigate blocking in the system. In some cases, UE 115-*b* and UE 115-*c* may both be potential relay UEs. In these cases, UE 115-*b* and UE 115-*c* may both relay the data packet to UE 115-*a*. Due to both UEs 115 receiving the indicated information in the request from UE 115-*a*, the UEs 115 may relay the data packet using the same transmission parameters. Upon receiving both data packets, UE 115-*a* may combine the transmissions and decode the data packet. The complexity of combining the transmissions may be reduced based on the common transmission parameters used by the relay UEs 115. In some cases, UE 115-*a* may set one or more thresholds for relaying the packet to limit the number of valid relay UEs 115 in the system.

In some cases, the packet may be relayed with a high MCS (e.g., a higher MCS than the original packet transmission from the base station 105). Additionally or alternatively, MIMO may be used to reduce the resource usage at the blocked UE 115-*a*. In some cases, power control may be implemented by a relay UE 115-*b* such that the transmit power supports reception of the packet at the blocked UE 115-*a*, but does not support reception much beyond the blocked UE 115-*a*. By implementing power control, interference with other UEs 115 (e.g., other receiving UEs 115 not shown) may be mitigated, which may improve overall network performance.

It is to be understood that the processes described with reference to wireless communications system 200 may apply to IIoT, V2X, D2D, and/or URLLC systems, or any other types of systems supporting side-link communications between devices. Additionally, the communications described may be examples of unicast, broadcast, and/or multicast signaling.

Figure 3:
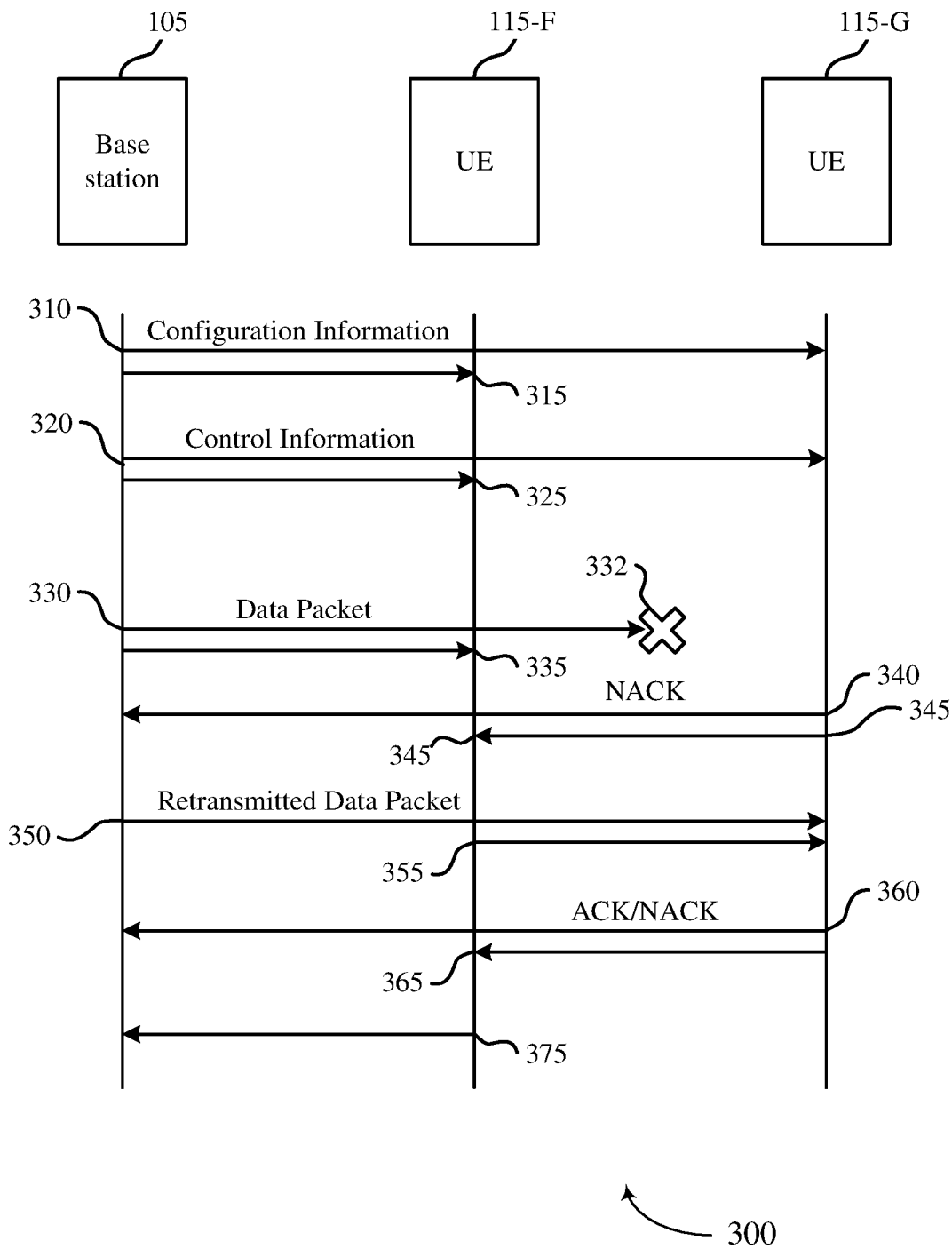
FIG. 3 illustrates an example of a process flow that supports relaying of messages, in accordance with one or more aspects of the present disclosure.

FIG. 3 illustrates an example of a process flow 300 that supports relaying of messages, in accordance with one or more aspects of the present disclosure. The process flow 300 may illustrate an example relaying scheme to provide a UE 115 with a missed data packet. In some examples, process flow 300 may implement aspects of wireless communications systems 100 and 200. Process flow 300 is an illustrative representation of the signals between the entities shown therein.

At 310 and 315, base station 105 (e.g., a source transmitter) may transmit configuration information that configures UEs, such as UEs 115-*f* and 115-*g*, for NACK triggered relay retransmission in accordance with aspects of the present disclosure. Although the transmissions are shown as separate in FIG. 3, the configuration information may be provided in UE specific transmissions, UE group transmissions, broadcast messaging or some combination thereof. The configuration information may include an identification of which UEs may need relay assistance, which UEs may act as relays, which signals or transmissions should be relayed, limits or restrictions on retransmissions, resources for retransmissions, and other parameters that may be useful in NACK triggered retransmission.

At 320, base station 105 may transmit control information, such as downlink control information (DCI), to UE 115-*g*, informing UE 115-*g* of resources for future transmissions. The resources may be scheduled for a single transmission, or may for multiple transmissions, For example, the control information may include configurations for semi-persistent or periodic scheduling of transmissions from base station 105 to UE 115-*g*. At 325, UE 115-*f* may receive the control information for UE 115-*g*, if it has been so configured by the configuration information at 315.

At 330, base station 105 may transmit a signal that may include a data packet in a transmission. The transmission may be intended for reception at UE 115-g. However, the data packet may not be received by UE 115-g, which may be due to interference, blocking, shadowing, or a combination thereof 332. At 335, 115-f may successfully receive the data packet from base station 105, based on the previously received configuration information.

At 340, UE 115-g (e.g., a blocked or receiving UE 115) may identify a failure to receive the data packet from base station 105. In some cases, the failure to receive the data packet may occur when the remaining delay budget for the packet is low (e.g., below some threshold) and the receiving UE 115-g may be unable to wait for a next retransmission from the base station 105. The failure may be determined based on receiving control information that indicates scheduled resources for a transmission of the data packet, but UE 115-g fails to decode the data packet in the indicated resources. Receiving UE 115-g may also determine whether there are future retransmissions scheduled based on the information indicated in the decoded control.

In response to identifying the failure to receive data, UE 115-g may transmit a message indicating the failure to receive the data packet to base station 105. In some cases, the failure message may be transmitted based on determining that the data packet could not be successfully received and decoded as scheduled according to the control information. In some cases, the failure message may be a NACK. In some cases additional information in the failure message may include an RSRP threshold, an ID indicating base station 105, a packet ID indicating the data packet, an exclusion range for a reserved resource, an MCS index, a transmission mode, an RV, a reference signal pattern, or a combination thereof.

At 345, UE 115-f may also receive the request (NAK) and determine whether to relay the data packet to UE 115-g. For example, UE 115-f may determine if it is close enough to UE 115-g based on location information for the two UEs. Additionally or alternatively, UE 115-f may determine if it has a strong enough link quality with UE 115-g based on the RSRP for receiving the failure message at 325. In some cases, UE 115-f may determine to relay the data packet to UE 115-g based on the identified RSRP being greater than an RSRP threshold, the identified distance being less than a distance threshold, UE 115-f supporting transmitting in the indicated resources, or a combination thereof.

At 350, base station 105 may retransmit the data packet to UE 115-g. The retransmission may be in response to receiving a NACK at 340, or a failure to receive an ACK within a timeout interval. The retransmitted packet may be received by UR 115-g or, because of continued blockage 332 the retransmission may also fail.

In response to receiving the NACK at 345, UE 115-f may relay the data packet to UE 115-g at 355. The data packet was previously received at 335. The data packet may be relayed by UE 115-f to UE 115-g on previously reserved resources. The resources may be previously configured at 310 or may be reserved in a control message at 320. In some cases, UE 115-f may adjust a power control parameter for relaying the data packet based on the RSRP for receiving the failure message. UE 115-f may select transmit parameters for relaying the data packet based on the parameters indicated in the failure message (i.e., the request for the packet). In some cases, UE 115-g may successfully receive the relayed data packet from UE 115-f on the reserved resources. In accordance with the configuration information and/or the control information, the base station 105 and UE 115-f (and other UEs if so configured) may all transmit the data packet at 350 and 355. The transmissions of the various devices may be coordinated by time division (TDD), frequency division (FDD), and/or spacial division (SDD) multiplexing.

At 360, UE 115-g may transmit an ACK to indicate it successfully received the data, which may have been transmitted by base station 105 at 350, or by UE 115-f at 355. UE 115-g may instead transmit a NACK to indication a failure to receive the data from either base station 105 or UE 115-f. The ACK or NACK may be received by base station 105 at 360, and may also be received by UE 115-f at 365. Because what ever blockage, interference, or the like 332 that prevented successful reception at 330 may prevent successful transmission of the ACK/NACK at 360, at 375 UE 115-f may retransmit the ACK/NACK to base station 205.

Figure 4:
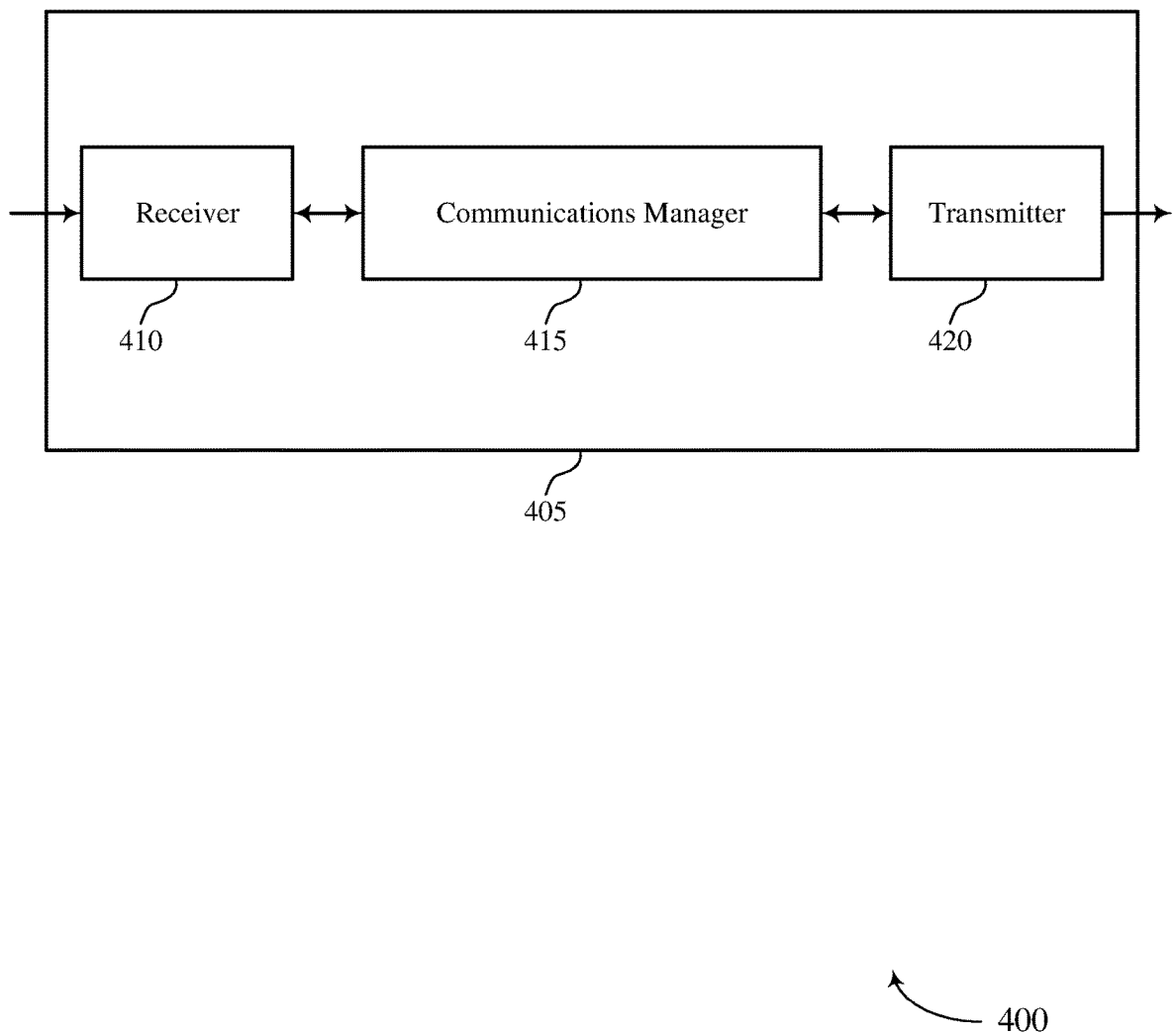
FIGS. 4 and 5 show block diagrams of devices that support relaying of messages, in accordance with one or more aspects of the present disclosure.

FIG. 4 shows a block diagram 400 of a device 405 that supports relaying of messages, in accordance with one or more aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to relaying of messages, etc.). Information may be passed on to other components of the device 405. The receiver 410 may be an example of aspects of the transceiver 620 described with reference to FIG. 6. The receiver 410 may utilize a single antenna or a set of antennas.

The communications manager 415 may be implemented at a first UE. In some cases, the communications manager 415 may identify a failure of the first UE to receive a data packet from a base station in a transmission, transmit a message indicating the failure of the first UE to receive the data packet, and receive, from a second UE different from the first UE, the data packet based on the message indicating the failure of the first UE to receive the data packet (NAK). Additionally or alternatively, the communications manager 415 may receive a data packet from a base station in a transmission, receive, from a second UE, a message indicating a failure of the second UE to receive the data packet, and relay the data packet to the second UE based on the message indicating the failure (NAK) of the second UE to receive the data packet. The communications manager 415 may be an example of aspects of the communications manager 610 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 620 described with reference to FIG. 6. The transmitter 420 may utilize a single antenna or a set of antennas.

Figure 5:
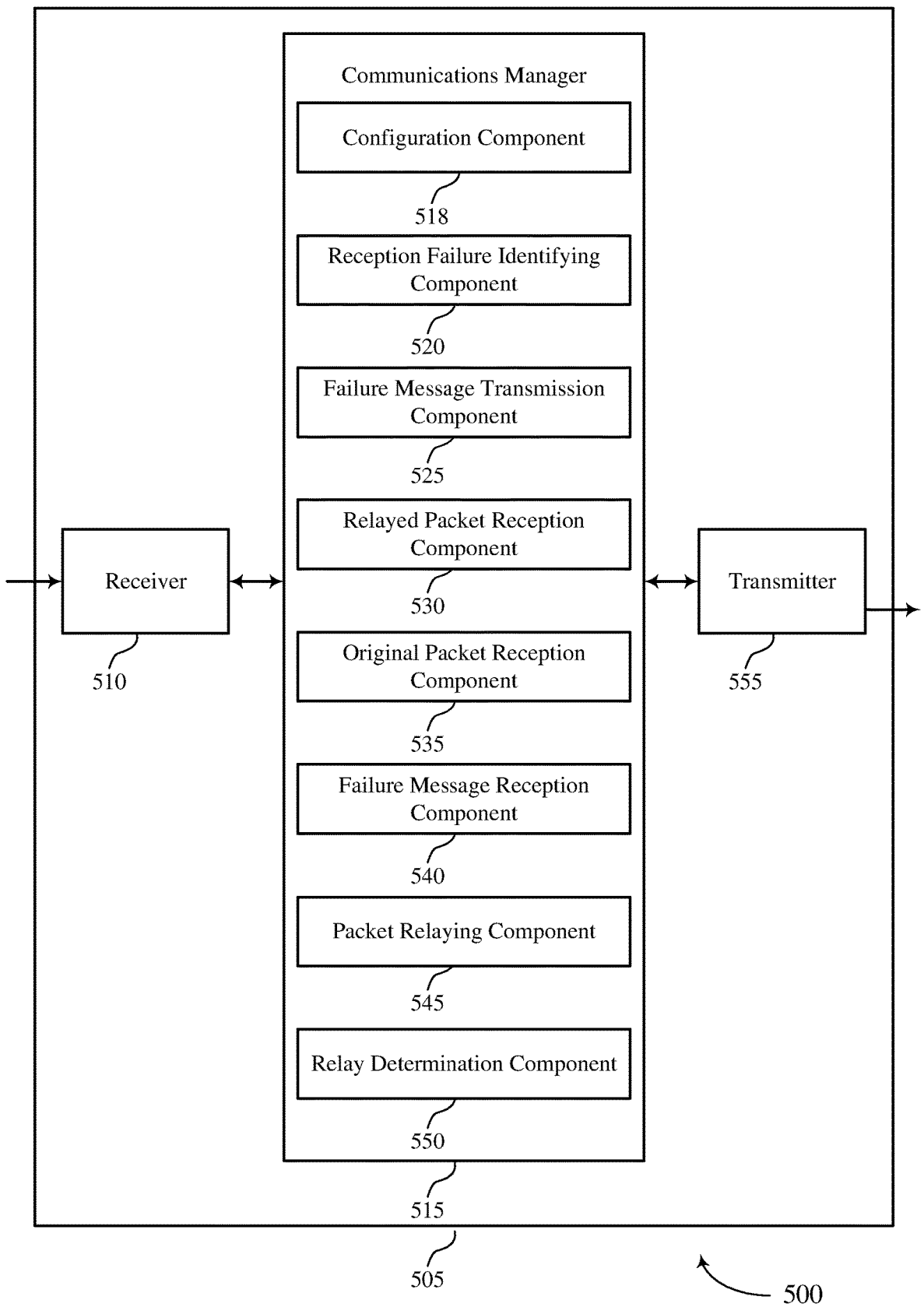

FIG. 5 shows a block diagram 500 of a device 505 that supports relaying of messages, in accordance with one or more aspects of the present disclosure. The device 505 may be an example of aspects of a device 405 or a UE 115 as described herein. The device 505 may include a receiver 510, a communications manager 515, and a transmitter 555. The device 505 may also include a processor. Each of these components may be in communication with one another (e.g., via one or more buses).

The receiver 510 may receive information such as packets, user data, or control information associated with various information channels (e.g., control channels, data channels, and information related to relaying of messages, etc.). Information may be passed on to other components of the device 505. The receiver 510 may be an example of aspects of the transceiver 620 described with reference to FIG. 6. The receiver 510 may utilize a single antenna or a set of antennas.

The communications manager 515 may be an example of aspects of the communications manager 415 as described herein. The communications manager 515 may include a configuration component 518, a reception failure identifying component 520, a failure message transmission component 525, a relayed packet reception component 530, an original packet reception component 535, a failure message reception component 540, a packet relaying component 545, a relay determination component 550, or some combination of these components. The communications manager 515 may be an example of aspects of the communications manager 610 described herein. The communications manager 515 may be implemented by a first UE.

The configuration component 518 may receive, via receiver 510, a configuration message from a base station or other network entity responsible for coordinating operation of device 505. The message may configure device 505 to receive data messages destined for other devices, to receive failure messages (NAKs) from the other devices, and to relay the received data messages to their intended device in response to the NAKs. The configuration may include resources reserved for transmitting the relayed data message.

The reception failure identifying component 520 may identify a failure of the first UE to receive a data packet from a base station in a transmission. The failure message may be a NAK. The failure message transmission component 525 may transmit a message indicating the failure of the first UE to receive the data packet. The relayed packet reception component 530 may receive, from a second UE, the data packet based on the message indicating the failure of the first UE to receive the data packet. In some cases, the operations performed by the reception failure identifying component 520, the relayed packet reception component 530, or both may be performed by the receiver 510 or a transceiver 620. Additionally or alternatively, the operations performed by the failure message transmission component 525 may be performed by the transmitter 550 or the transceiver 620.

The original packet reception component 535 may receive a data packet from a base station or other device acting as a source transmitter. The failure message reception component 540 may receive, from a second device 505, a message indicating a failure of the second device to receive the data packet. The packet relaying component 545 may relay the data packet to the second device 505 based on the message indicating the failure of the second device 505 to receive the data packet. In some cases, the operations performed by the original packet reception component 535, the failure message reception component 540, or both may be performed by the receiver 510 or a transceiver 620. Additionally or alternatively, the operations performed by the packet relaying component 545 may be performed by the transmitter 550 or the transceiver 620.

The relay determination component 550 may additionally handle conflicts between relaying information, transmitting original information, receiving information, or some combination of these (e.g., for some types of wireless devices, such as half-duplex devices). For example, the relay determination component 550 may identify multiple messages indicating failures to receive different data packets and may determine the resources for relaying the different data packets overlap (e.g., overlap in time). The relay determination component 550 may determine which data packet to relay based on priority values for the data packets or a random selection procedure. The priority values may be configured by configuration component 518. Similarly, if the device 505 identifies a packet to relay on demand, and determines that the resources for relaying the packet overlap (e.g., overlap in time) with resources scheduled for receiving a transmission at the device 505 or transmitting an original transmission by the device 505, the relay determination component 550 may determine whether to relay the packet or receive the transmission or transmit the original packet based on one or more conflict handling rules. For example, the relay determination component 550 may determine how to operate in the overlapping resources based on priority values for the data packets, priority values for the relaying, transmitting, and/or receiving operations, a random selection procedure, or some combination of these criteria.

The transmitter 555 may transmit signals generated by other components of the device 505. In some examples, the transmitter 555 may be collocated with a receiver 510 in a transceiver module. For example, the transmitter 555 may be an example of aspects of the transceiver 620 described with reference to FIG. 6. The transmitter 555 may utilize a single antenna or a set of antennas.

Figure 6:
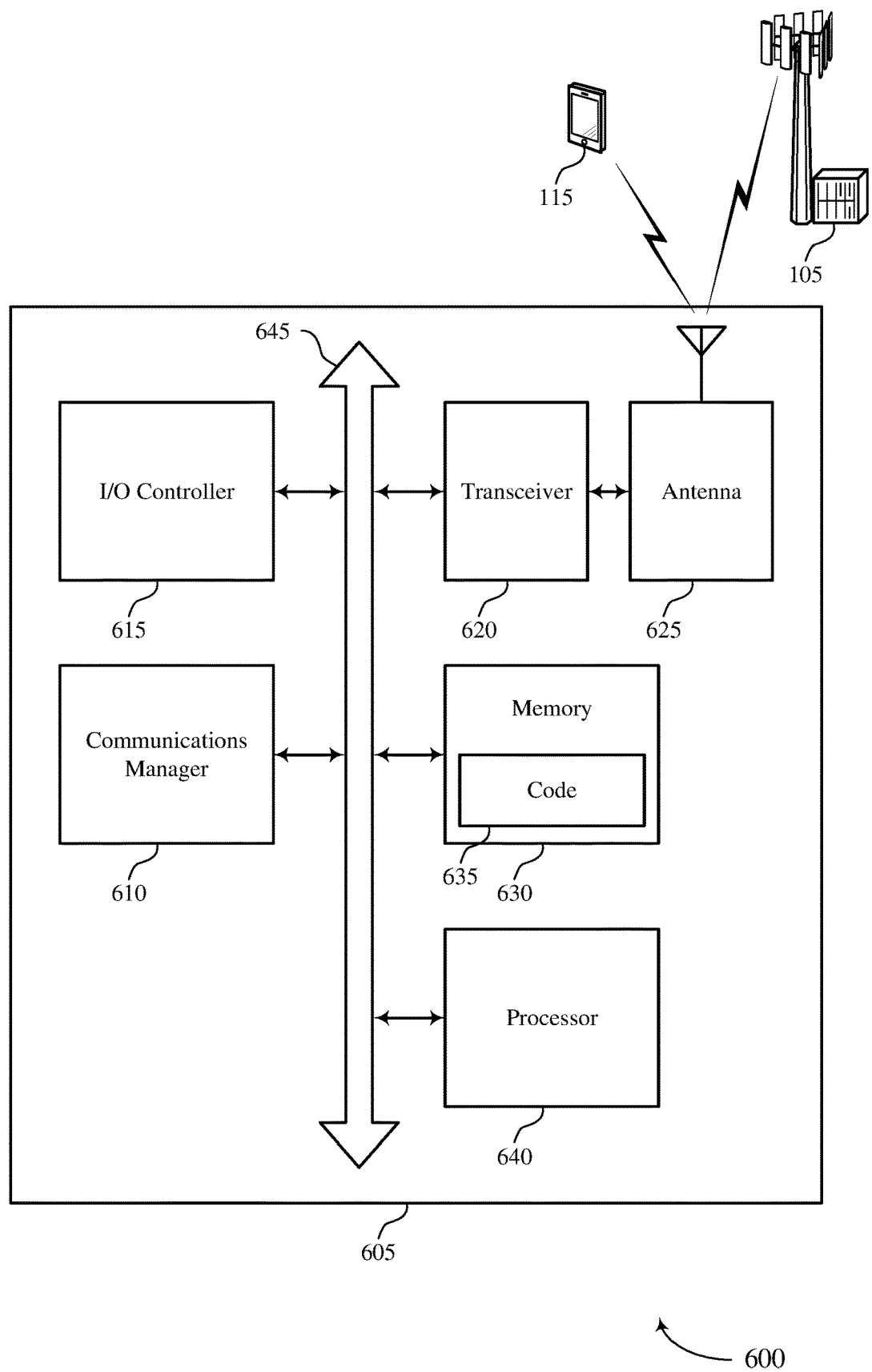
FIG. 6 shows a diagram of a system including a device that supports relaying of messages, in accordance with one or more aspects of the present disclosure.

FIG. 6 shows a diagram of a system 600 including a device 605 that supports relaying of messages, in accordance with one or more aspects of the present disclosure. The device 605 may be an example of or include the components of device 405, device 505, or a UE 115 as described herein. The device 605 may include components for bi-directional voice and data communications including components for transmitting and receiving communications, including a communications manager 610, an I/O controller 615, a transceiver 620, an antenna 625, memory 630, and a processor 640. These components may be in electronic communication via one or more buses (e.g., bus 645).

The device 605 may be an example or a component of a first UE. The communications manager 610 may identify a failure of the first UE to receive a data packet from a second UE in a transmission, transmit a message indicating the failure of the first UE to receive the data packet, and receive, from a third UE different from the second UE, the data packet based on the message indicating the failure of the first UE to receive the data packet. Additionally or alternatively, the communications manager 610 may receive a data packet from a second UE in a transmission, receive, from a third UE, a message indicating a failure of the third UE to receive the data packet, and relay the data packet to the third UE based on the message indicating the failure of the third UE to receive the data packet.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

In some cases, the wireless device may include a single antenna 625. However, in some cases the device may have more than one antenna 625, which may be capable of concurrently transmitting or receiving multiple wireless transmissions.

The memory 630 may include random access memory (RAM) and read-only memory (ROM). The memory 630 may store computer-readable, computer-executable code 635 including instructions that, when executed, cause the processor to perform various functions described herein. In some cases, the memory 630 may contain, among other things, a basic I/O system (BIOS) which may control basic hardware or software operation such as the interaction with peripheral components or devices.

The processor 640 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting relaying of messages).

The code 635 may include instructions to implement aspects of the present disclosure, including instructions to support wireless communications. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

Figure 7:
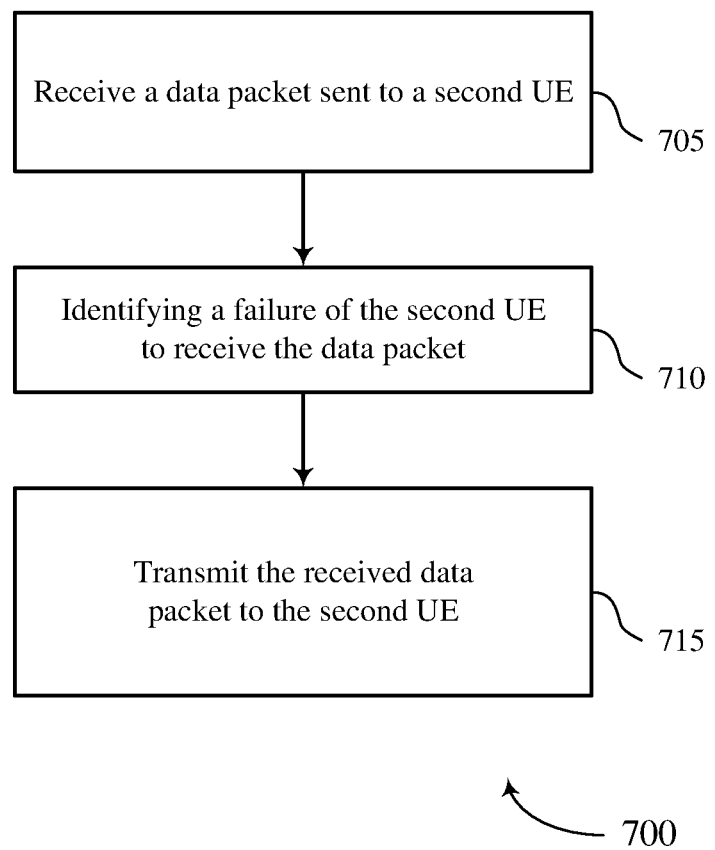
FIGS. 7 through 9 show flowcharts illustrating methods that support relaying of messages, in accordance with one or more aspects of the present disclosure.

FIG. 7 shows a flowchart illustrating a method 700 performed, for example, by a UE in accordance with aspects of the present disclosure. As shown in FIG. 7, in a first aspect, process 700 may include at 705 receiving a data packet sent to a second UE; at 710 identifying a failure of the second UE to receive the data packet; and at 715 transmitting the received data packet to the second UE. In a second aspect, method 700 may also include receiving configuration information. In a third aspect, method 700 may include receiving and transmitting the data packet based on the configuration information.

In a forth aspect, in combination with any of the first to third aspects, method 700 may include detecting a negative acknowledgment (NAK) transmitted by the second UE. A fifth aspect, including any earlier aspect, of process 700 may include detecting a successful reception of the data packet by the second UE, which may include detecting an ACK message. In a sixth aspect, process 700 may further include transmitting the detected successful reception message to the sender of the data packet.

Figure 8:
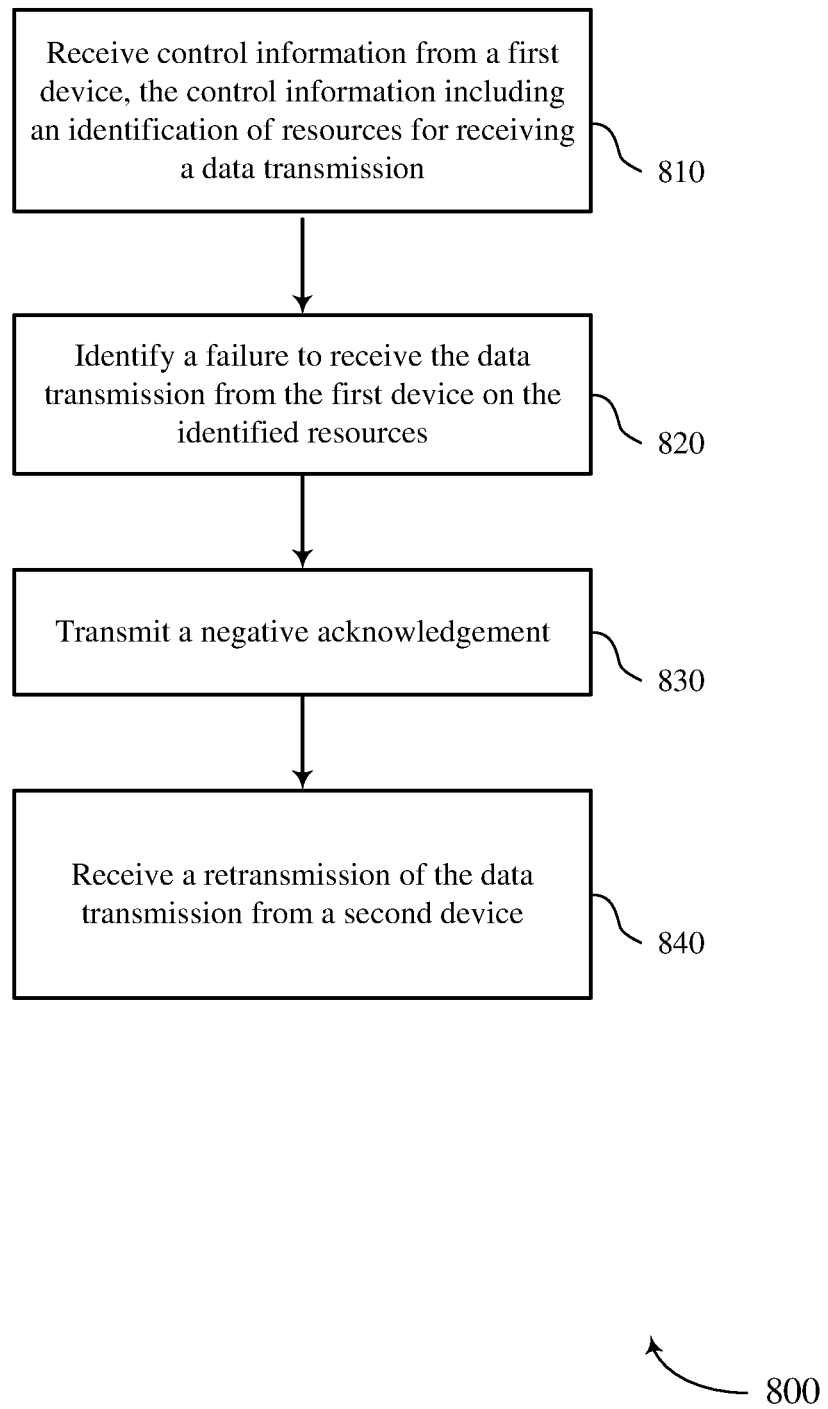

FIG. 8 shows a flowchart illustrating a method 800 performed, for example, by a UE in accordance with aspects of the present disclosure. As shown in FIG. 8, in a first aspect, process 800 may include receiving control information from a first device at 810, the control information including an identification of resources for receiving a data transmission; identifying at 820 a failure to receive the data transmission from the first device on the identified resources; transmitting at 830 a negative acknowledgement; and receiving at 840 a retransmission of the data transmission from a second device.

In second and third aspects, process 800 may further include receiving configuration information and receiving the data transmission based on the configuration information. In a fifth aspect, the configuration information may include the reservation of resources for receiving the retransmission.

Figure 9:
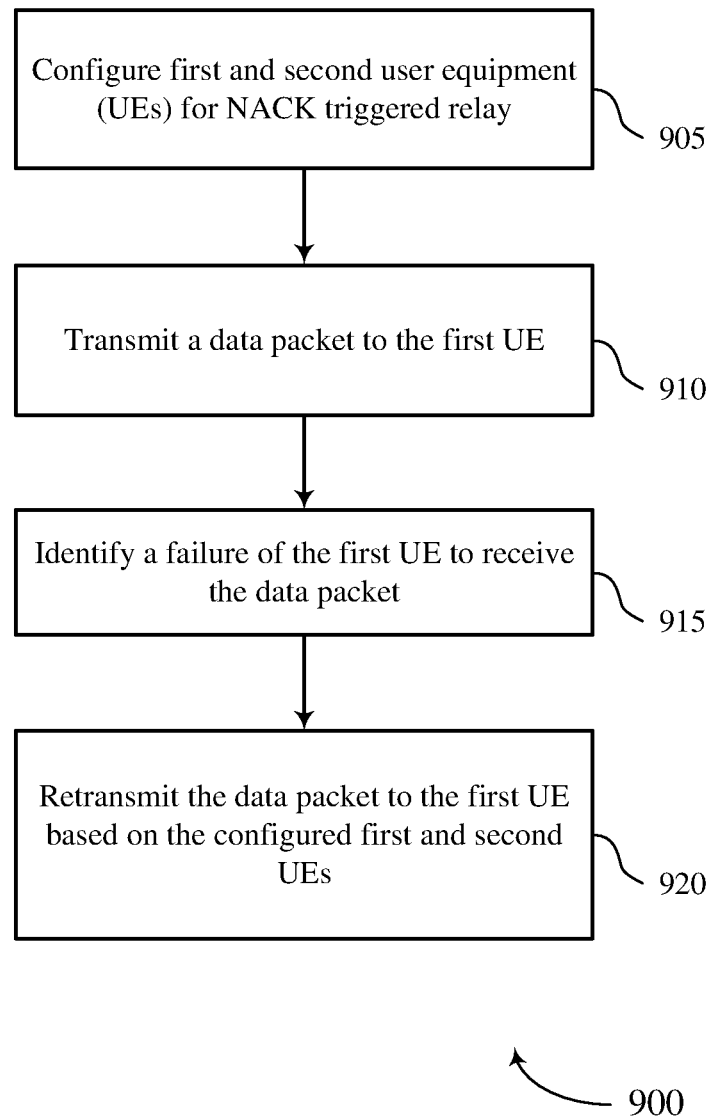

FIG. 9 shows a flowchart illustrating a process 900 performed, for example, by a base station in accordance with aspects of the present disclosure. As shown in FIG. 9, in a first aspect, process 900 may include configuring first and second user equipment (UEs) for NACK triggered relay at 905; transmitting a data packet to the first UE at 910; identifying a failure of the first UE to receive the data packet at 915; and retransmitting the data packet to the first UE at 920.

It should be noted that the methods described herein describe possible implementations, and that the operations and the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving configuration information, configuring the first UE as a negative acknowledgement triggered relay;
   receiving, in accordance with the configuration information and from a source transmitter, control information indicating resources allocated for communication between the source transmitter and a second UE, wherein the control information includes a configuration for scheduling semi-persistent transmission of a data packet via a forward link transmission from the source transmitter to the second UE;
   receiving the data packet from the source transmitter;
   receiving an acknowledgement or negative acknowledgement (ACK/NACK), the ACK/NACK corresponding to the data packet; and
   transmitting the data packet to the second UE on the indicated resources based on the first UE determining to relay the data packet in response to the ACK/NACK being a NACK.

2. The method of claim 1, wherein receiving and transmitting the data packet comprises receiving and transmitting the data packet based on the configuration information.

3. The method of claim 1, further comprising detecting a successful reception of the data packet by the second UE.

4. The method of claim 3, wherein detecting a successful reception of the data packet by the second UE comprises detecting an ACK message.

5. The method of claim 4, further comprising transmitting a detected successful reception message to a sender of the data packet.

6. The method of claim 3, further comprising identifying a failure of the second UE to receive the data packet by detecting a negative acknowledgment transmitted by the second UE.

7. The method of claim 1, wherein determining whether to relay the data packet to the second UE comprises determining whether a distance between the first and second UEs is less than a threshold distance or a reference signal received power (RSRP) of the ACK/NACK is greater than an RSRP threshold.

8. A first user equipment (UE) for wireless communication, comprising:
   one or more memories; and
   one or more processors, coupled to the one or more memories, the one or more processors individually or collectively configured to cause the first UE to:
   receive configuration information, configuring the first UE as a negative acknowledgment triggered relay;
   receive, in accordance with the configuration information and from a source transmitter, control information indicating resources allocated for communication between the source transmitter and a second UE, wherein the control information includes a configuration for scheduling semi-persistent transmission of a data packet via a forward link transmission from the source transmitter to the second UE;
   receive the data packet from the source transmitter;
   receive an acknowledgement or negative acknowledgement (ACK/NACK), the ACK/NACK corresponding to the data packet; and
   transmit the data packet to the second UE on the indicated resources based on the first UE determining to relay the data packet in response to the ACK/NACK being a NACK.

9. The first UE of claim 8, wherein the one or more processors are further configured to cause the first UE to:
   receive and transmit the data packet based on the configuration information.

10. The first UE of claim 8, wherein the one or more processors are further configured to cause the first UE to:
    identify a failure of the second UE to receive the data packet by detecting a negative acknowledgment transmitted by the second UE.

11. The first UE of claim 10, wherein the one or more processors are further configured to cause the first UE to:
    detect a successful reception of the data packet by the second UE.

12. The first UE of claim 11, wherein, to detect the successful reception of the data packet, the one or more processors are configured to cause the first UE to:
    detect a successful reception of the data packet by the second UE by detecting an ACK message.

13. The first UE of claim 11, wherein the one or more processors are further configured to cause the first UE to:
    transmit a detected successful reception message to a sender of the data packet.

14. The first UE of claim 8, wherein, to determine whether to relay the data packet to the second UE, the one or more processors are configured to cause the first UE to:
    determine whether a distance between the first UE and the second UE is less than a threshold distance or a reference signal received power (RSRP) of the ACK/NACK is greater than an RSRP threshold.

15. A non-transitory computer-readable medium storing a set of instructions for wireless communication, the set of instructions comprising:
one or more instructions that, when executed by one or more processors of a first user equipment (UE), cause the first UE to:
receive configuration information, configuring the first UE as a negative acknowledgment triggered relay;
receive, in accordance with the configuration information and from a source transmitter, control information indicating resources allocated for communication between the source transmitter and a second UE, wherein the control information includes a configuration for scheduling semi-persistent transmission of a data packet via a forward link transmission from the source transmitter to the second UE;
receive the data packet from the source transmitter;
receive an acknowledgement or negative acknowledgement (ACK/NACK), the ACK/NACK corresponding to the data packet; and
transmit the data packet to the second UE on the indicated resources based on the first UE determining to relay the data packet in response to the ACK/NACK being a NACK.

16. The non-transitory computer-readable medium of claim 15, wherein, to determine whether to relay the data packet to the second UE, the one or more instructions cause the first UE to:
determine whether a distance between the first UE and the second UE is less than a threshold distance or a reference signal received power (RSRP) of the ACK/NACK is greater than an RSRP threshold.

17. The non-transitory computer-readable medium of claim 15, wherein the indicated resources include a set of resources for scheduling the semi-persistent transmission of the data packet to the second UE.

18. An apparatus for wireless communication, comprising:
means for receiving configuration information, configuring the apparatus as a negative acknowledgment triggered relay;
means for receiving, in accordance with the configuration information from a source transmitter, control information indicating resources allocated for communication between the source transmitter and a target user equipment (UE), wherein the control information includes a configuration for scheduling semi-persistent transmission of a data packet via a forward link transmission from the source transmitter to the target UE;
means for receiving the data packet from the source transmitter;
means for receiving an acknowledgement or negative acknowledgement (ACK/NACK), the ACK/NACK corresponding to the data packet; and
means for transmitting the data packet to the target UE on the indicated resources based on the apparatus determining to relay the data packet in response to the ACK/NACK being a NACK.

19. The apparatus of claim 18, further comprising:
means for determining whether a distance to the target UE is less than a threshold distance, or
means for determining whether a reference signal received power (RSRP) of the ACK/NACK is greater than an RSRP threshold.

20. The apparatus of claim 18, wherein the indicated resources include a set of resources for scheduling the semi-persistent transmission of the data packet to the target UE.

* * * * *